Nov. 17, 1953

G. L. HELLER 2,659,662

PROCESS FOR PRODUCING CARBON BLACK

Filed Nov. 14, 1950

INVENTOR
George L. Heller
BY
Pennie, Edmonds, Morton & Barrows
ATTORNEYS

UNITED STATES PATENT OFFICE 2,659,662

PROCESS FOR PRODUCING CARBON BLACK

George L. Heller, Monroe, La., assignor to Columbian Carbon Company, New York, N. Y., a corporation of Delaware Application November 14, 1950, Serial No. 195,529

4 Claims. (Cl. 23—209.4)

The present invention relates to the manufacture of carbon black and particularly to the process involving the thermal decomposition of a hydrocarbon by rapidly and uniformly mixing it with a hot gaseous medium at a temperature well in excess of that at which the hydrocarbon is decomposed to carbon black.

In the Wiegand and Braendle Patent No. 2,378,055 there is described an improved process of the type just noted in which a combustible mixture of a fluid hydrocarbon fuel and air is blasted into one end of an elongated, unobstructed chamber to form a turbulent stream of hot blast flame gases. This turbulent stream of blast flame gases flows through the chamber and, at a zone removed from the zone of generation of the blast flame gases, the hydrocarbon to be decomposed is separately and forcefully injected into the turbulent stream of hot gases.

The present invention provides a desirable modification of the type of process described in the patent and permits the use of a heavy, normally liquid, relatively inexpensive hydrocarbon as the hydrocarbon to be decomposed with greater advantage than heretofore.

In operations such as specifically illustrated in the patent, the hydrocarbon to be decomposed, herein designated "make," is radially injected into the furnace chamber as relatively small high velocity streams, advantageously positioned directly opposite one another. The make has normally been a gaseous hydrocarbon, natural gas, for instance, or a normally gaseous hydrocarbon enriched by mixing therewith vapors of a higher molecular weight, normally liquid hydrocarbon.

With the growing demand and increasing distribution facilities for natural gas for other purposes, it has become highly desirable to adapt carbon black processes to the use of other raw materials as the make. Within the petroleum industry there are available certain high boiling petroleum fractions and residuum unfit for further processing and which cannot be distilled, or further treated, economically. Unfortunately, the tendency of such higher boiling fractions and residuum hydrocarbons to decompose upon heating is much more pronounced than that of the normally gaseous, or lower molecular weight liquid hydrocarbons. These complex hydrocarbons and "tars" decompose at temperatures usually well below their boiling points and any attempt to vaporize them prior to injection into the reaction zone of a carbon black process, as make, results in a rapid coking of the vaporizing chamber or conduits leading therefrom to the furnace chamber and high loss in raw materials. This difficulty has been a deterrent to such operations.

A logical solution to such problem was, of course, to spray the liquid hydrocarbons directly into the reaction chamber and this has been proposed in certain types of operation. However, it has necessitated the use of very high pressures to atomize the oil into the chamber and relatively cool furnace atmosphere at the point of entry of the make to permit at least partial vaporization before admixture with separately introduced air for combustion. Atomization of the oil, even at extremely high pressure, produces oil droplets in excess of 200 millimicrons in diameter and usually has resulted in the production of a relatively coarse type of carbon pigment. Efforts to meet the requirements have led to the axial introduction of the high pressure oil spray with circumferential or tangential injection of air for combustion. Thus, the spray nozzle is protected from high furnace temperatures and the swirling air along the outer walls, to some extent, offsets and helps to prevent coke accumulation on the furnace walls due to impingement thereon by the high pressure spray.

A difficulty heretofore experienced where it has been attempted to produce carbon black from liquid hydrocarbons has been due to the fact that where concentrated hydrocarbons, either liquid, vapor, or gas, are permitted to come in contact with hot solid surfaces such as brickwork or furnace lining, an undesirable type of carbon is formed, apparently due to some catalytic action of the solid surface. The use of an elongated, unobstructed reaction chamber more readily permits the injection of an oil spray into the chamber with little or no contact between concentrated hydrocarbons and the furnace chamber by axial injection of the oil spray. However, that type of operation is deficient with respect to extremely rapid mixing of the make with the hot furnace gases.

An essential and desirable feature of the process to which the present invention relates is the extremely rapid mixing of the make with the hot blast flame gases. This more rapid mixing is best attained by injecting the make radially into the furnace chamber. Heretofore it has not been practical to spray liquid hydrocarbons radially into the reaction chamber in operations of this type, due to excessive coking of the spray-head and tubes leading thereto. By the present invention, it is possible to use radial injection of a heavy liquid hydrocarbon without such coking difficulties.

In accordance with my present invention, the make, or a substantial part thereof, is composed of normally liquid hydrocarbons and this liquid make is injected, as such, radially, or substantially so, into the hot blast flame gases passing through the reaction chamber. The reaction chamber is, with advantage, of cylindrical cross-section with tangentially positioned blast burners so as to result in a swirling stream of blast flame gases. A related process in which hydrocarbons are injected into a swirling stream of furnace gases is disclosed and claimed in my copending application Serial No. 64,764, filed December 11, 1948.

The invention is especially useful, as applied to operations employing cylindrical reaction chambers equipped with tangential blast burners, the make being injected at a zone downstream from the blast burners. In such operations it appears that the blast flame gases tend to follow a more or less helical path through the chamber and, therefore, a path of much greater length, so that, for a given time within a reaction chamber of a given length, much higher blast flame gas velocities may be maintained than would be possible if the blast flame gases were passed generally axially through the chamber. Also, in operations of this sort, coordination of the velocities of the blast flame gases and the entering make is much less critical.

Further, in accordance with my present invention, the liquid make is maintained at a temperature below that at which the particular make would decompose to form substantial amounts of carbon, or coke, until after it has been injected into the furnace chamber. This is accomplished by circulating a cooling medium in heat exchange relation with the liquid make as the latter passes through the highly heated walls of the reaction chamber. The cooling of the make may also be effected to some extent by passing air, or other gaseous atomizing medium, steam, for instance, in heat exchange relation with the make as it passes through the highly heated chamber walls, as more fully described and claimed in my copending application, Serial No. 195,530, filed concurrently herewith.

Reaction chambers used in the manufacture of furnace carbons, by operations of the type to which my present invention relates, necessarily have relatively thick side walls and, during operation, the side walls become very highly heated. Temperatures are normally attained which are substantially in excess of those where many hydrocarbons are rapidly decomposed to form carbon. The avoiding of overheating of the liquid hydrocarbon make while passing through the highly heated furnace side walls is an essential feature of my present invention.

The invention will be more fully described and illustrated by reference to the accompanying drawings which show conventionally and somewhat diagrammatically, apparatus found particularly useful in carrying out the process and of which Figure 1 is a longitudinal sectional view in elevation of a reaction chamber, together with accessories, including adjacent cooling equipment;

In the apparatus shown, the numeral 1 indicates a cylindrical reaction and cooling chamber, opening at one end into the vertical cooler 2. At the left-hand end the reaction chamber is closed by the block 3 through which conduit 4 extends axially, the conduit being adapted to the introduction of secondary air into the reaction chamber, as required.

Figure 1:
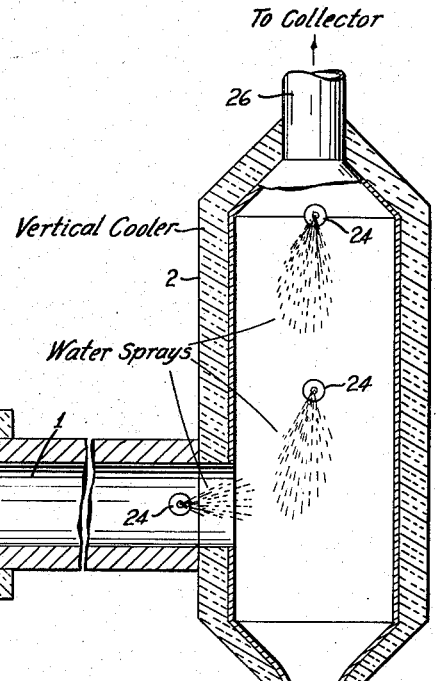
Figure 1:
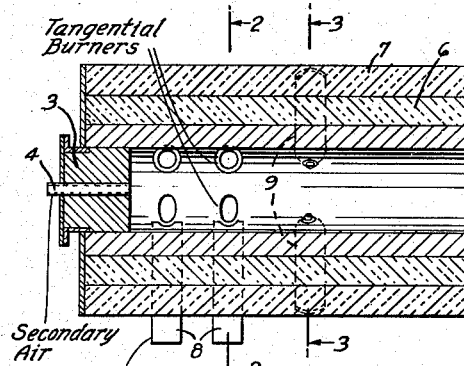
Figure 2:
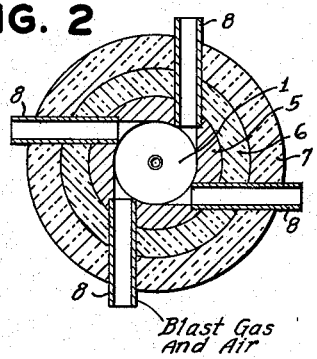
Fig. 2 is a transverse sectional view of the reaction chamber along the lines 2—2 of Fig. 1.

The chamber 1 is formed by the cylindrical side walls 5 of highly refractory material which, in turn, is covered by layers 6 and 7 of heat insulating material. Extending through the layers of heat insulating material and the furnace side wall, substantially normal to the longitudinal axis of the chamber, are four blast burner ports 8, each entering the furnace chamber in a circumferential, or tangential, direction, as more clearly shown in Fig. 2 of the drawings. The apparatus shown is provided with two substantially identical sets of these blast burner ports positioned at different distances from the end of block 3. In operation, only one or both sets of ports may be used, as desired.

Figure 3:
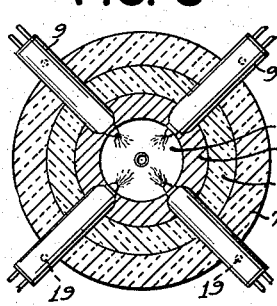
Fig. 3 is a transverse sectional view of the reaction chamber along the lines 3—3 of Fig. 1, showing the liquid make injection nozzles.

Further downstream, the furnace chamber is provided with a set of four radially extending make injection nozzles 9, spaced 90° apart and extending through the layers of insulating material and the furnace side wall, as more clearly shown in Fig. 3 of the drawings. These nozzles are provided for the injection into the furnace chamber of liquid hydrocarbon to be decomposed and are normally positioned with their inner ends substantially flush with the inner wall of the furnace chamber. Still further downstream, the furnace is provided with a second set of liquid make injection nozzles 9 substantially identical with those just described.

Figure 4:
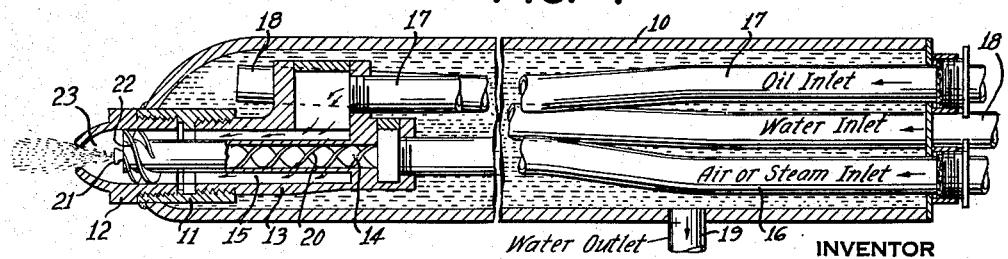
Fig. 4 is a somewhat enlarged longitudinal sectional view of said nozzles.

As shown more clearly in Fig. 4 of the drawings, these liquid make injection nozzles are composed of an outer casing 10, which extends through the furnace wall in contact with the hot furnace refractories. At the left-hand end, the nozzle is equipped with an internally threaded collar 11 secured to the casing, as by welding. At its inner end, the nozzle is equipped with a nozzle tip 12 threaded into the collar 11. Threaded into the other end of the collar is a member 13 composed of an inner passageway 14 and an outer annular passageway 15. The outer end of the inner passageway 14 is connected by tube 16 to a source of air, steam, or other atomizing gas. The annular passageway is connected by tube 17 to a source of liquid hydrocarbon make. A cooling fluid, water, for instance, is passed into the nozzle casing through tube 18 in contact with the outer casing walls and the parts within the casing and flows therefrom through water outlet 19.

In operation, oil, under moderate pressure, is passed into the annular chamber 15, from any convenient source through tube 17. An atomizing gas, under pressure, is supplied to the inner passageway 14 through the tube 16. Positioned within tube 14 is a spiralled baffle 20 so positioned and arranged as to cause the air to whirl in a counter-clockwise direction as it passes through the passageway 14 to the orifice 21.

Oil emerging from the annular space 15 is caused to whirl in a clockwise direction by the spiralled baffles 22. The stream of air and the stream of oil whirling in opposite directions are caused violently to impact one another within the chamber 23 of the nozzle tip and the oil is thereby highly atomized and injected into the reaction chamber.

Advantageously, the liquid make injection nozzles are so spaced about the periphery of the reaction chamber that each injection nozzle is diametrically opposite a second nozzle, the number of nozzles used in each set depending upon the diameter of the reaction chamber and the size of the nozzles.

The invention is particularly applicable to operations in which heavy, high molecular weight hydrocarbons, such as result from the cracking of petroleum, are used as the make. A particularly advantageous make is one comprising around 20 to 95%, usually in the range of 60 to 95%, by weight, or aromatic constituents, as determined by the test method D-875-46T of the American Society for Testing Materials. The liquid make should most suitably be one having an aniline cloud-point, as determined by the method prescribed by the said society and designated D-611-46T, within the range of 10° to 125° F. Its end point advantageously should exceed 725° F.

The liquid make may be heavy residuum oils or tars, such as fuel oils No. 5, No. 6 or Bunker C, but an especially useful product is one known as "pressure tar" or "flash drum tar" characterized by high aromaticity, low pour point and high specific gravity. Preferred tars of this type are those having A. P. I. values from +10 to −6, SSU fural viscosities at 122° F. of from 125 to 250, and which are soluble in pentachlorphenol and have specific gravities of from 0.95 to 1.1. These products are readily available from most refineries using thermal cracking methods. The products are essentially asphaltic residuums. In use, these heavy tars are preheated to about 250° F. or as required to reduce the viscosity for atomization, but not to exceed 500° F. Another efficacious procedure is to dilute the asphaltic products with an aromatic cycle stock to secure the desired pour point.

These high molecular weight hydrocarbons are rapidly cracked at temperatures well below those at which natural gas is actively decomposed. Because of its less refractory nature, it is important that such liquid make be more rapidly mixed uniformly with the blast flame gases. It has been proposed by another that the blast flame gases be made to assume a swirling motion through the chamber, as previously noted, so as to expedite the mixing. The present invention constitutes an improvement in that type of operation in that it permits the use of a heavy, readily decomposed hydrocarbon fraction as the make, while avoiding difficulties heretofore encountered, such as, excessive decomposition in the make injection tubes, or spray nozzles, and the coking and blocking of such tubes and nozzles. In addition to avoiding excessive decomposition in the injection apparatus, the process provides improved atomizing of the liquid hydrocarbon make and, consequently, more rapid uniform mixing of the make with the blast flame gases.

In operation of the apparatus shown in accordance with my present invention, a combustible mixture of a fluid hydrocarbon fuel and air is blasted at high velocity through the circumferential blast burner ports 8, is ignited and burned within the chamber to form a hot, highly turbulent mass of blast flame gases rapidly swirling through the chamber in a more or less helical path. This combustible mixture may be injected into a zone of the chamber more or less removed from the end block 3 by selection of one, or the other of the sets of blast burner ports.

The hydrocarbon to be decomposed is injected into the chamber through the nozzles 9. At the same time, atomizing gas, air, for instance, is passed under pressure to the respective nozzles through the tubes 16. In passing through the nozzles, the hydrocarbon is preheated somewhat but is maintained at a temperature below that at which decomposition resulting in the formation of substantial carbon or coke would occur, by circulating water, or other cooling fluid, through the chamber within the nozzle casing, as previously described.

The oil is atomized with the aid of the air, or other atomizing gas, and injected into the chamber and extremely rapidly and uniformly mixed with a swirling stream of hot blast flame gases. The heavier hydrocarbons are thereby rapidly and uniformly heated and decomposed to form carbon black in suspension in the furnace gases.

As the suspension flows through the downstream end of the chamber and through the vertical cooler, it is cooled by contact with the water sprays 24. Any unvaporized water from these sprays, together with any carbon knocked out of suspension, passes downwardly through the vertical cooler into the sump 25 and cooled suspension passes from the upper end of the vertical cooler through the conduit 26 to conventional separating and collecting apparatus, as well understood by the art.

As previously noted herein, the hydrocarbon make need not be supplied under high pressures in order to effect suitable atomization thereof, in accordance with the present invention, but may be supplied under moderate pressures, say, of the order of 2 to 4 pounds per square inch, gauge. The atomizing gas should, however, be supplied under substantial pressure advantageously, 50 to 100 pounds per square inch.

The cooling water is, with advantage, introduced into the inner end of the casing 10 so that the coolest water will flow directly in contact with the hottest, most critical portion of the atomizing nozzle. Satisfactory operation has been obtained, the temperature of the hydrocarbon being kept well below 500° F. where the cooling water was supplied at a rate approximating one gallon per minute per spray. Under such conditions, coking of the atomizing nozzles has been avoided under operating conditions where the temperature of the furnace zone into which the make was injected ranged from 2300° F. up to as high as 2950° F. Under such temperature conditions, the invention is especially useful.

The invention will be further described and illustrated by the following specific examples of embodiments thereof carried out in apparatus substantially as shown in the drawing. In each of these runs the combustible gas mixture was supplied under conditions such that the temperature of the zone of the furnace chamber into which the make hydrocarbons were injected was in excess of 2300° F. In each operation, the reaction chamber was of circular cross section. In Examples 1 to 6, inclusive, the reaction chamber had a diameter of 8⅝ inches and two oppositely positioned atomizing jets were used. In Example 7, the diameter of the furnace chamber was 18 inches and the chamber was equipped with 12 blast ports and 6 atomizing jets, the blast ports and atomizing jets, respectively, being substantially equally spaced circumferentially, each being used in this operation as previously described herein, other conditions being comparable. Also, in each instance, the hydrocarbon make was supplied under pressure of about three pounds per square inch, gauge, cooling water was passed through each of the atomizing nozzles at a rate of approximately one gallon per minute and the temperature of the oil at the spray tip was thereby prevented from exceeding about 200° F. The type of hydrocarbon make, the rate at which it was supplied and the identity, rate of supply and pressure of the atomizing gas are set forth in the following tabulation:

| Example | 1 | 2 | 3 | 4 | 5 | 6 | 7 |
|---|---|---|---|---|---|---|---|
| Hydrocarbon, make used | pressure tar. | 25% aromatic distillate; 75% pressure tar. | pressure tar. | pressure tar. | 25% aromatic distillate; 75% pressure tar. | 25% aromatic distillate; 75% pressure tar. | flash drum tar. |
| Supply rate, gals./hr | 36 | 41.8 | 32.8 | 31.8 | 35 | 33.8 | 186. |
| Atomizing gas used | Air | Air | Natural gas. | Natural gas. | Steam | Steam | Steam. |
| Supply rate, cu. ft./hr | 4,455 | 4,455 | 3,100 | 3,100 | 935 | 870 | 9,000. |
| Pressure lbs./sq. in | 75 | 75 | 75 | 75 | 50 | 45 | 70. |

In each instance, the operation was carried over prolonged periods without plugging of the atomizing nozzles and without intermittent interruption for the cleaning thereof.

The invention is independent of the precise construction and arrangement of the liquid make injection nozzles so long as the nozzles used are adapted thoroughly to atomize liquid hydrocarbon and to effect its cooling as it passes through the reaction chamber walls so as to prevent overheating and excessive decomposition of the hydrocarbon.

I claim:

1. In the process of producing carbon black by the decomposition of a hydrocarbon by which a combustible mixture of a fluid hydrocarbon fuel and an oxygen-containing gas is blasted into one end of an elongated reaction chamber, delineated by thick refractory side walls, and is burned therein to form a violently turbulent stream of hot blast flame gases passing longitudinally through the chamber at a temperature in excess of that at which hydrocarbons are decomposed to form carbon black and the hydrocarbon to be decomposed is separately injected into the turbulent stream of hot gases passing through the chamber at a point removed from the point of entry of said gases to the chamber and in which the side wall of the chamber becomes highly heated, the steps of passing a normally liquid hydrocarbon as a confined, substantially liquid stream through the hot side walls of the chamber in heat exchange relation therewith at a point downstream from the zone of combustion, atomizing the resultant preheated stream of the hydrocarbon and injecting it into the turbulent gas stream and passing a liquid cooling medium in thermal shielding relationship with the stream of hydrocarbon passing through the side wall of the chamber and in a direction generally countercurrent to the direction of flow of the stream, and thereby maintaining the temperature of the hydrocarbon below that at which substantial carbon-forming decomposition thereof is effected up to the point where it is injected into the chamber.

2. In the process of producing carbon black by the decomposition of hydrocarbon by which a combustible mixture of a fluid hydrocarbon fuel and an oxygen-containing gas is blasted into one end of an elongated cylindrical reaction chamber, delineated by thick refractory side walls, in a direction substantially tangential to the chamber and is burned therein to form a turbulent swirling stream of blast flame gases passing longitudinally through the chamber at a temperature in excess of that at which hydrocarbons are decomposed to form carbon black and the hydrocarbon to be decomposed is separately injected into the swirling gases at a point removed from the point of entry of said gases to the chamber and in which the side wall of the chamber becomes highly heated, the steps of passing a normally liquid hydrocarbon as a confined, substantially liquid stream through the hot side walls of the chamber in heat exchange relation therewith, at a point downstream from the zone of combustion, atomizing the resultant preheated stream of the hydrocarbon and injecting it into the turbulent gas stream and passing a liquid cooling medium in thermal shielding relationship with the stream of hydrocarbon passing through said side wall of the chamber and in a direction generally countercurrent to the direction of flow of the stream, and thereby maintaining the temperature of the hydrocarbon below that at which substantial carbon forming decomposition thereof is effected up to the point where it is injected into the chamber.

3. The process of claim 2 further characterized in that the cooling medium is first passed through the chamber walls as a confined stream and is initially brought into thermal shielding relationship with the hydrocarbon stream near the inner wall of the furnace chamber and passes outwardly through the wall of the chamber in thermal shielding relationship with the incoming stream of cooling medium.

4. In the process of producing carbon black by the decomposition of a hydrocarbon by which a combustible mixture of a fluid hydrocarbon fuel and an oxygen-containing gas is blasted into one end of an elongated, cylindrical reaction chamber, delineated by thick refractory side walls, in a direction substantially tangential to the chamber and is burned therein to form a turbulent swirling stream of blast flame gases passing longitudinally through the chamber at a temperature in excess of that at which hydrocarbons are decomposed to form carbon black and the hydrocarbon to be decomposed is separately injected into the swirling gases at a point removed from the point of entry of said gases to the chamber and in a substantially radial direction, and in which the side wall of the chamber becomes highly heated, the steps of passing a normally liquid hydrocarbon as a confined substantially liquid stream and a separate adjacent stream of an atomizing gas through the hot side wall of the chamber at a point downstream from the zone of combustion in heat exchange relation with the chamber side walls, whereby the atomizing gas is strongly preheated, atomizing the liquid hydrocarbon by violent impact with the preheated atomizing gas and injecting the atomized hydrocarbon into the turbulent gas stream flowing through the reaction chamber, and passing a liquid cooling medium in thermal shielding relationship with the streams of hydrocarbon and atomizing gas passing through the side walls of the chamber and in a direction generally countercurrent to the direction of flow of said streams, and thereby maintaining the temperature of the hydrocarbon below that at which substantial carbon decomposition thereof is effected up to the point where it is injected into the chamber.

GEORGE L. HELLER.

References Cited in the file of this patent

UNITED STATES PATENTS

| Number | Name | Date |
|---|---|---|
| Re. 22,886 | Ayers | June 3, 1947 |
| 363,086 | Schoen | May 17, 1887 |
| 744,220 | Neu | Nov. 17, 1903 |
| 903,736 | Lee | Nov. 10, 1908 |
| 1,036,758 | Walters et al. | Aug. 27, 1912 |
| 1,438,032 | Frost | Dec. 5, 1922 |
| 1,617,074 | Matlock | Feb. 8, 1927 |
| 1,807,321 | Miller | May 26, 1931 |
| 2,375,795 | Krejci | May 15, 1945 |
| 2,440,424 | Wiegand et al. | Apr. 27, 1948 |
| 2,553,199 | Loving | May 15, 1951 |
| 2,599,981 | Eckholm | June 10, 1952 |